UNITED STATES PATENT OFFICE.

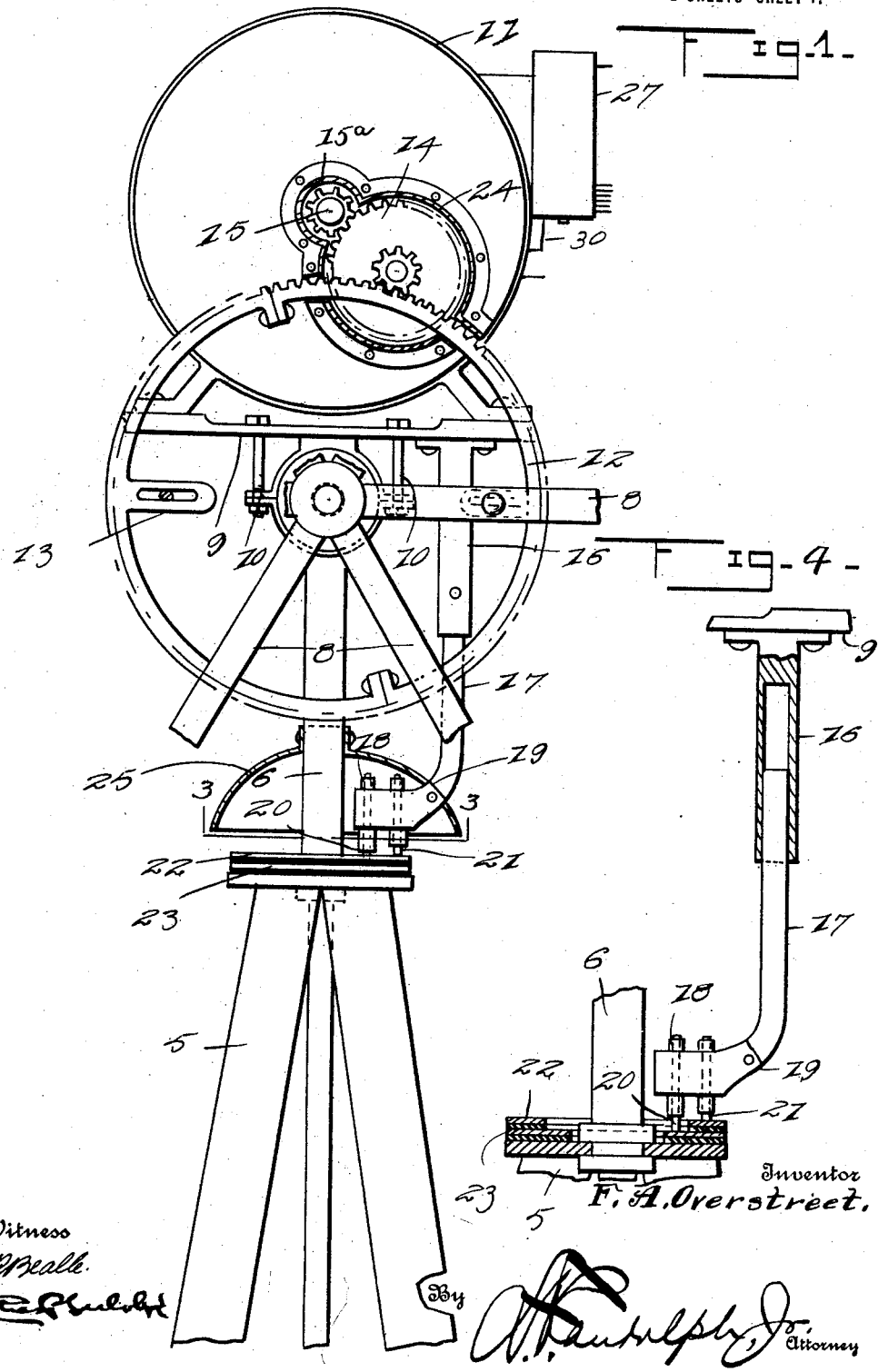

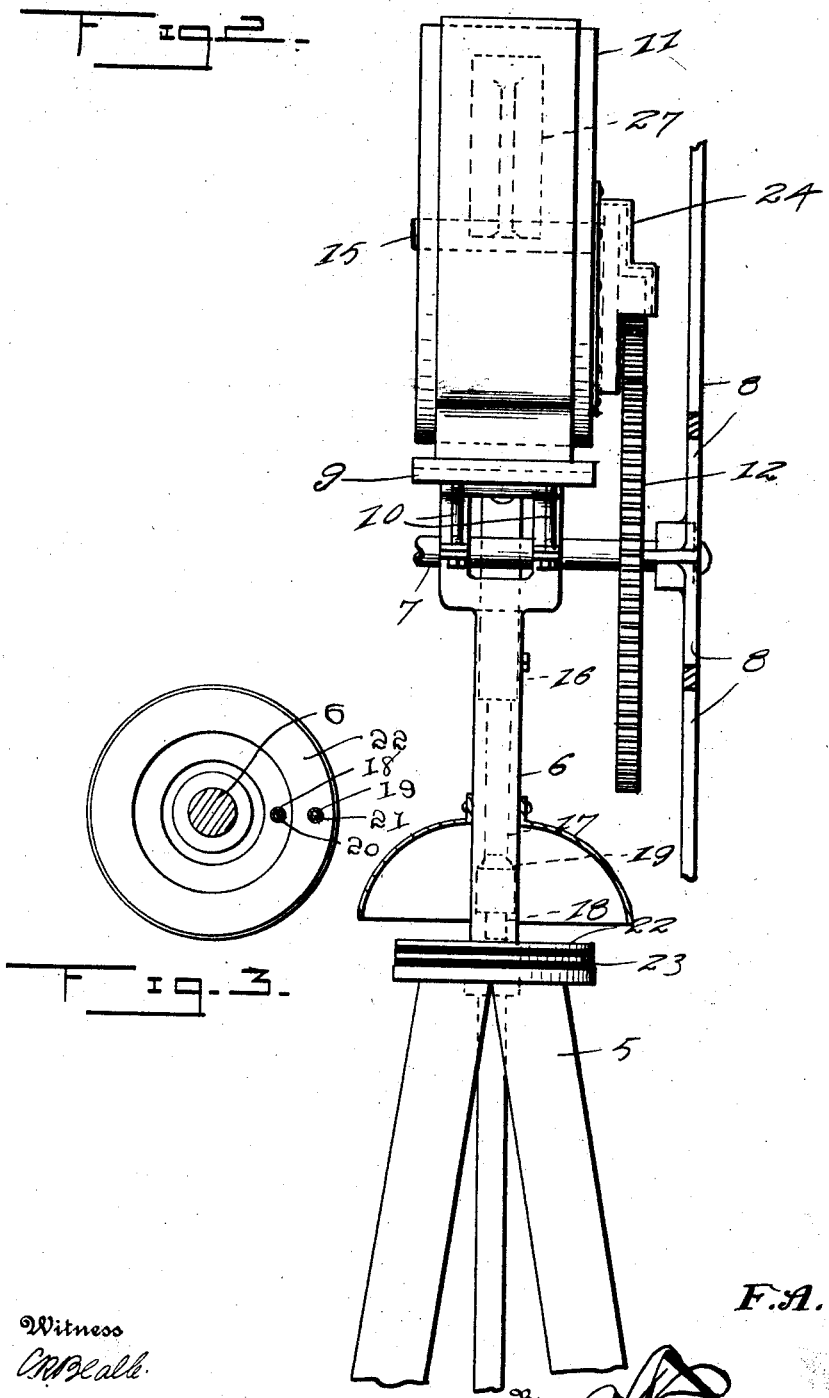

FRANK A. OVERSTREET, OF FORT SUMNER, NEW MEXICO.

WINDMILL-OPERATED GENERATOR.

1,347,970.     Specification of Letters Patent.     Patented July 27, 1920.

Application filed October 7, 1916. Serial No. 124,323.

*To all whom it may concern:*

Be it known that I, FRANK A. OVERSTREET, a citizen of the United States, residing at Fort Sumner, in the county of Guadalupe and State of New Mexico, have invented certain new and useful Improvements in Windmill-Operated Generators; and I do hereby declare the following to be a full, clear, and exact description of the invention, such as will enable others skilled in the art to which it appertains to make and use the same.

This invention has for its object to provide an improved generator attachable to and operable by a windmill for utilizing the power of the windmill in the production of an electrical current.

Another object of the invention is the provision of means for controlling the output of the generator so as to prevent overloading of the circuit incident to the variations in the speed of the windmill.

Another object is the provision of an automatic cutout of novel and efficient contruction for preventing the electricity stored in the battery from discharging into the generator, when the latter is idle.

With these and other objects in view, the invention consists in the noved construction, combination and arrangement of parts as will be hereinafter specifically described, claimed and illustrated in the accompanying drawing, in which:

Figure 1 is a front elevation, partly broken away, of a windmill, showing the improved generator attached thereto, Fig. 2 is a side elevation, partly broken away, thereof, Fig. 3 represents a horizontal sectional view on the line 3—3 of Fig. 1, and Fig. 4 represents a fragmentary vertical sectional view through the windmill.

Referring to the drawings in detail, wherein similar reference numerals designate corresponding parts throughout the several views, the numeral 5 indicates the supporting frame structure of a well known type of windmill upon which is supported the rotatable frame 6. The wind wheel shaft 7 is rotatably supported in the frame 6 and carries the spider 8 to which the blades of the wind wheel are attached.

The generator attachment comprises the generator base 9 detachably secured to the frame 6 by bolts 10 and upon which is supported the generator 11. A split gear wheel 12 is provided with inwardly directed arms 13 adjustably secured to the spider 8, whereby the gear wheel is rotated therewith. The gear wheel 12 is connected by a train of gears 14 with a pinion 15$^a$ on the generator shaft 15, whereby the rotary movement of the windmill is transmitted to the generator.

A depending socket or sleeve 16 is connected with the generator base 9 and receives a downwardly extending and vertically adjustable arm 17. A pair of brush holders 18 and 19 are secured to the lower terminal of the arm 17 and receive brushes 20 and 21, respectively, which engage the annular contacts 22 and 23, which latter are supported upon the top of the windmill frame 5 and are insulated from the latter and each other. By proper adjustment of the arm 17 the brushes 20 and 21, when worn may be brought into proper relation to the annular contacts.

The gear wheels 15$^a$ and 14 are completely inclosed in a gear case 24 and the contacts 22 and 23 and the brushes 20 and 21 are inclosed in a casing 25.

A housing 27 is secured laterally to the generator casing and incloses an electrical governor, not shown.

What I claim is:

A contact device comprising a support, a pair of annular contact elements insulated from each other and mounted one above the other upon the support, vertically disposed brushes bearing at their lower ends upon the upper surfaces of the contact elements, an arm carrying the brushes, a sleeve slidably receiving said arm and a base member journaled for rotation and disposed above the contact elements and supporting the sleeve.

In testimony whereof I affix my signature in presence of two witnesses.

FRANK A. OVERSTREET.

Witnesses:
K. W. EDWARDS,
M. V. EDWARDS.